United States Patent
Musselman et al.

(10) Patent No.: US 6,264,294 B1
(45) Date of Patent: Jul. 24, 2001

(54) TAPERED TRACTION STUD, STUD MOUNT AND METHOD OF MAKING AND MOUNTING

(75) Inventors: James Musselman; Robert Musselman; Mark Musselman, all of Hope, MI (US)

(73) Assignee: International Engineering and Manufacturing, Inc., Hope, MI (US)

( * ) Notice: Subject to any disclaimer, the term of this patent is extended or adjusted under 35 U.S.C. 154(b) by 0 days.

(21) Appl. No.: 09/325,659

(22) Filed: Jun. 4, 1999

(51) Int. Cl.[7] .................................................. B62D 55/26
(52) U.S. Cl. ................................................................ 305/178
(58) Field of Search ..................... 305/167, 168, 305/166, 170, 171, 174, 178, 160, 161, 162, 165, 180, 179

(56) References Cited

U.S. PATENT DOCUMENTS

| | | |
|---|---|---|
| 1,617,729 | 2/1927 | Varga . |
| 1,653,526 | 12/1927 | White . |
| 2,040,696 | 5/1936 | Johnston ................................ 305/10 |
| 2,345,763 | 4/1944 | Mayne ................................... 305/10 |
| 2,362,638 | 11/1944 | Kilborn .................................. 305/10 |
| 2,739,017 | 3/1956 | Arps ....................................... 305/10 |
| 3,779,617 * | 12/1973 | Palmer ................................... 305/179 |
| 3,838,894 * | 10/1974 | Reedy .................................... 305/180 |
| 3,883,190 * | 5/1975 | Kilbane, Jr. ........................... 305/180 |
| 4,154,488 * | 5/1979 | Svensson et al. ..................... 305/157 |
| 5,188,441 * | 2/1993 | Rubel .................................... 305/180 |
| 5,642,921 | 7/1997 | Webb et al. .......................... 305/179 |
| 5,676,437 * | 10/1997 | Holmgren et al. .................... 305/180 |
| 5,690,398 | 11/1997 | Pribyl .................................... 305/162 |
| 5,716,112 * | 2/1998 | Staszak ................................. 305/180 |
| 5,921,642 * | 7/1999 | Tschida ................................. 305/180 |

FOREIGN PATENT DOCUMENTS

| | | | |
|---|---|---|---|
| 1073505 * | 3/1980 | (CA) . | |
| 1078717 * | 8/1967 | (GB) ................................... | 305/160 |

OTHER PUBLICATIONS

"Hooker Plate" drawings submitted by applicant as supplemental information disclosure statement, Mar. 14, 2000.*

* cited by examiner

Primary Examiner—S. Joseph Morano
Assistant Examiner—Long Bao Nguyen
(74) Attorney, Agent, or Firm—John J. Swartz

(57) ABSTRACT

A traction stud and method of making and mounting a one-piece traction stud having a mounting end, a ground engaging end and an intermediate section therebetween which has an outer surface that flares radially outwardly in an axially outward direction to provide a self locking surface for detachably locking the stud to a snowmobile track. A stud mount is provided for mounting the stud on a snowmobile track including a threaded cylinder for threadedly receiving the threaded mounting end of the stud and a skirt, which radially outwardly flares in axially outer direction, to provide an internal self locking bearing surface against which the tapered surface on the traction stud bears to detachably lock the stud to the drive track. The stud mount is embedded in the track and may include a hollow transverse mounting head which is disposed on a reinforcing bar that is embedded in the track.

120 Claims, 6 Drawing Sheets

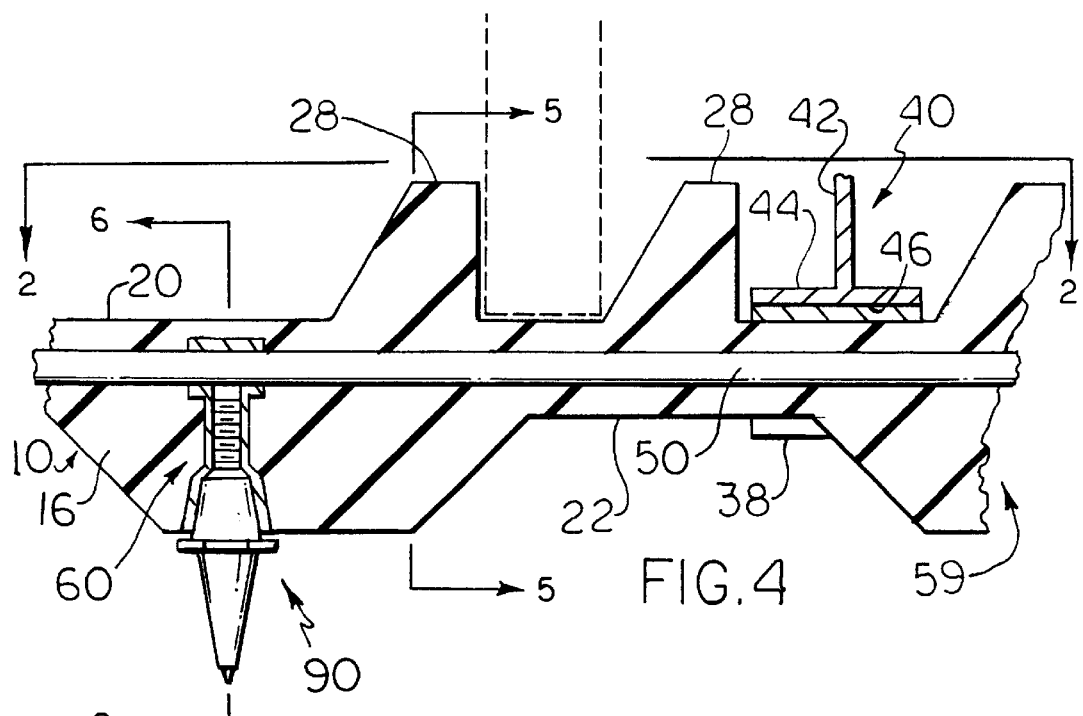
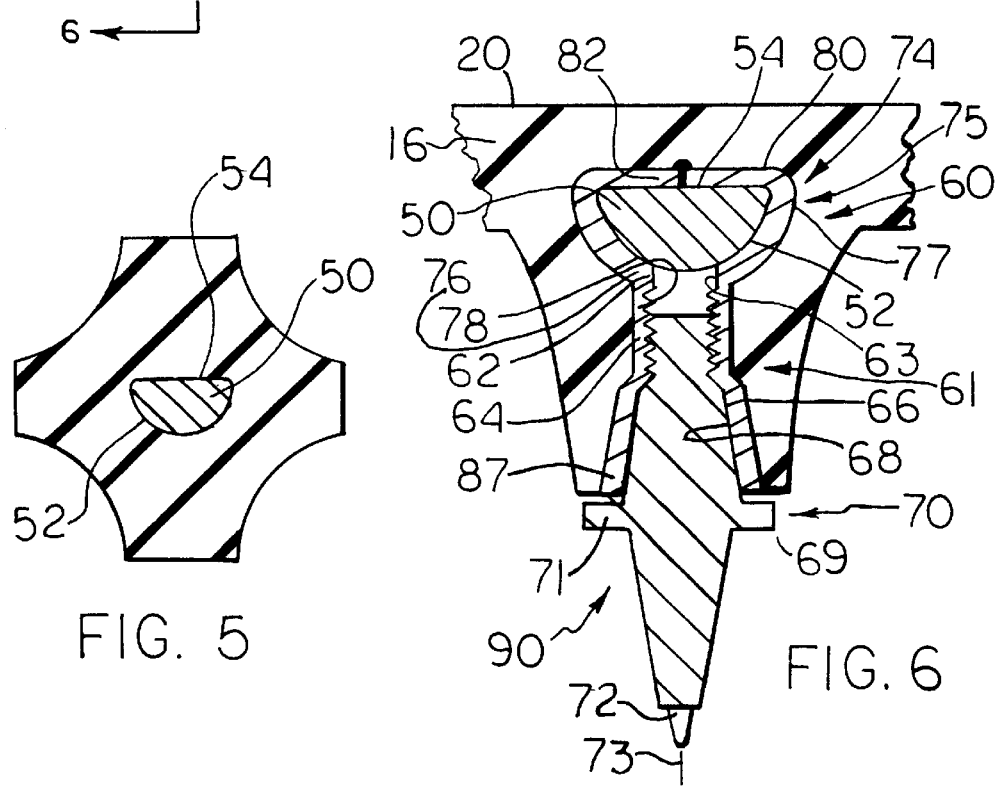

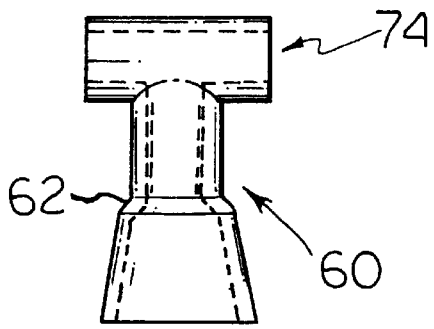
FIG. 7
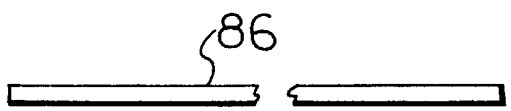
FIG. 8
FIG. 9B
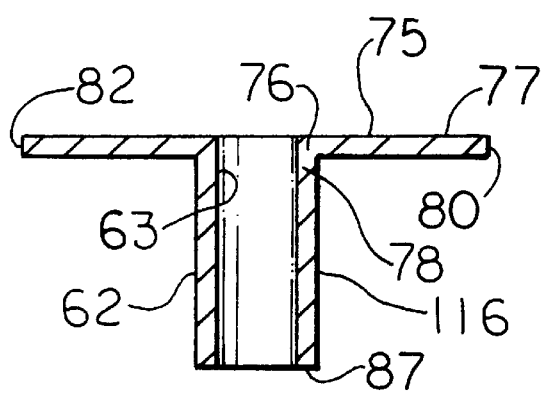
FIG. 9
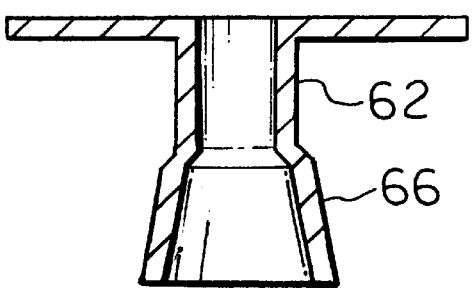
FIG. 9A
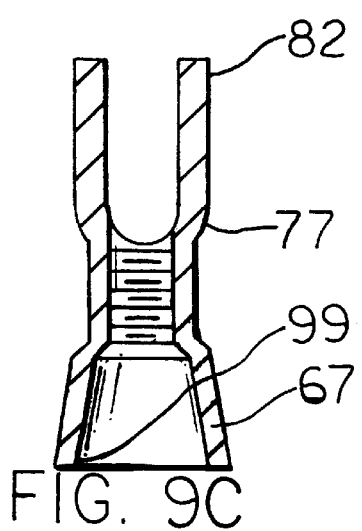
FIG. 9C
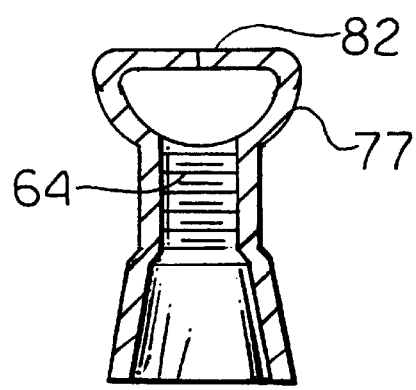
FIG. 10

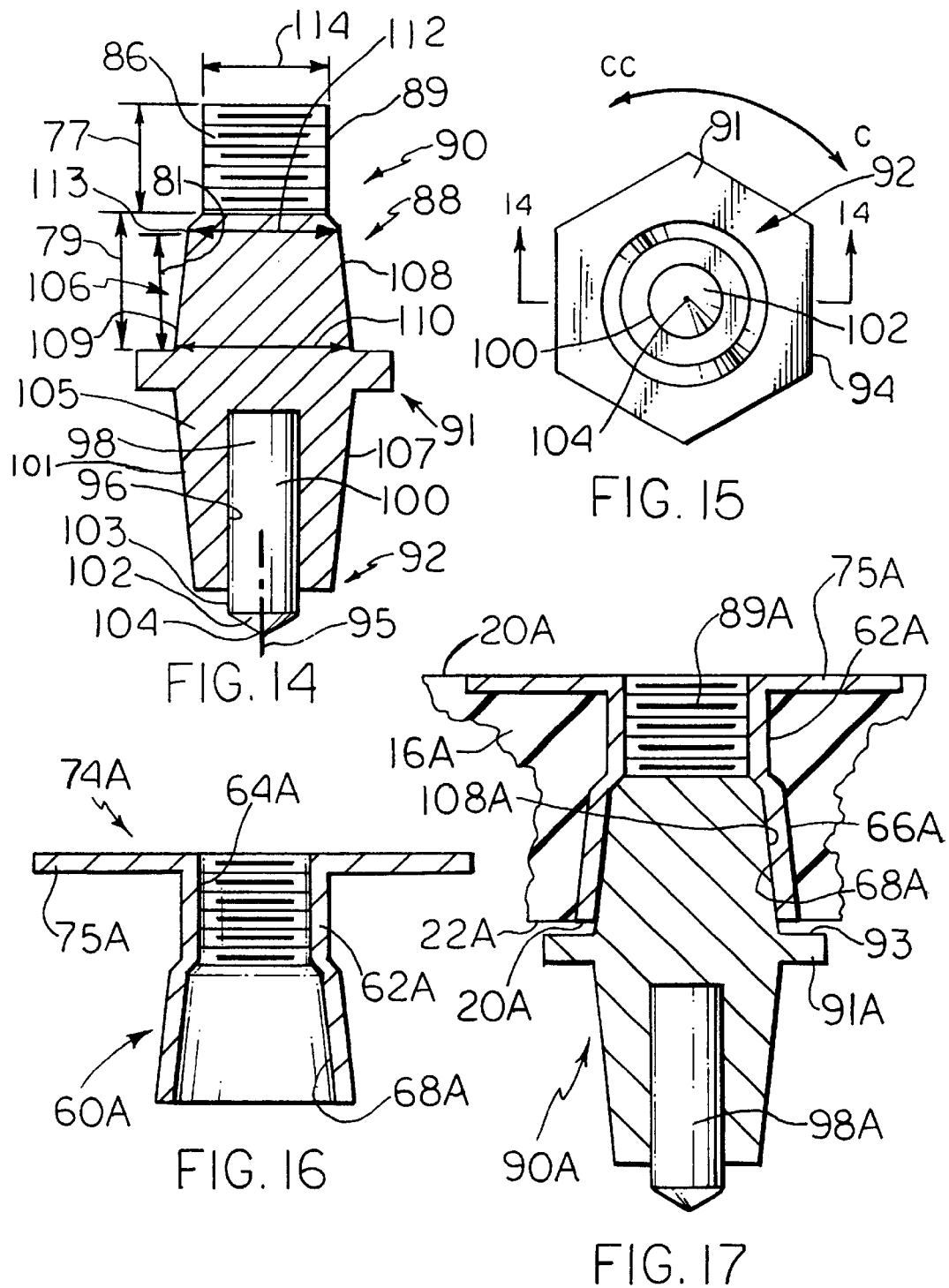

TAPERED TRACTION STUD, STUD MOUNT AND METHOD OF MAKING AND MOUNTING

BACKGROUND OF THE INVENTION

1. Field of the Invention

This invention relates to a traction stud for an endless drive belt and more particularly to a traction stud having a self-locking, outwardly flaring locking surface for frictionally bearing against a complementally formed locking surface of a stud mount that is embedded in an endless snowmobile drive track.

2. Description of the Prior Art and Objects

Traction studs have been provided for snowmobile endless drive tracks, such as that illustrated in U.S. Pat. No. 5,234,266, issued to James R. Musselman, et al, on Aug. 10, 1993, which includes a fastener for threading onto the shank of a "push through" snowmobile traction stud to detachably clamp the stud to a track. If a "push through" traction stud of the type disclosed in this patent breaks or needs to be replaced, the fastener is unturned, a new stud installed and the fastener replaced. Another so-called "T-nut" style traction stud is illustrated in U.S. Pat. No. 3,838,894 issued to Donald G. Reedy on Oct. 1, 1974, and includes a T-shaped internally threaded fastener that is mounted to the inside surface of an endless snowmobile drive track and generally must be replaced when a stud is replaced. The Reedy patent also discloses a washer which is disposed between an axially outer portion of the stud and the outside surface of the track and includes apertures therein for receiving a portion of the track to inhibit turning of the stud relative to the T-nut. If the traction studs inadvertently unturn, they can be more easily broken or dislodged from the snowmobile drive track, thereby decreasing traction. Any traction reduction particular concern and importance to snowmobile racers who require maximum traction capabilities in order to maintain racing superiority. One solution to the problem of a stud unturning is the use an adhesive type substance on the stud thread such as that sold under the trademark "Loc-tite" to detachably lock the traction stud to the T-nut, however the use of Loc-tite is expensive and relatively time consuming to install.

Accordingly, it is an object of the present invention to provide a new and novel traction stud with new and improved characteristics for maintaining the stud on the track.

It is another object of the present invention to provide a new and novel stud mount for detachably locking a traction stud to an endless drive track.

It is another object of the present invention to provide a new and novel traction stud for an endless drive track which includes new and novel structure for detachably locking the traction stud to the drive track.

It is another object of the present invention to provide a new and novel traction stud and stud mount which are self-locking without the use of adhesives and fasteners.

Another object of the present invention is to provide a new and novel stud mount for improving the characteristics of detachably securing a traction stud to an endless drive belt.

Both of the prior art T-nut and push through style studs are typically mounted with a backer plate or washer disposed between an axially outer portion of the stud and the outer track surface to help laterally stabilize the stud and preclude the stud from pulling through the track. The replacement of studs of the type disclosed in the aforementioned U.S. Pat. No. 5,234,266 typically includes the replacement of not only the stud and stud fastener, but also a washer, which precludes the stud from pulling through the track. Such prior art stud assemblies thus include a plurality of parts which must be assembled and disassembled. The turn around time required to replace broken studs is particularly important to snowmobile racers and the assembly and disassembly of the various stud mounting components is time consuming. Accordingly, it is another object of the present invention to provide a new and novel stud which facilitates a faster turn around time for replacing traction studs.

It is another object of the present invention to provide a new and novel stud mount which facilitates a faster turn around time for replacing traction studs.

It is a further object of the present invention to provide a new and novel method for mounting a traction stud to an endless drive track.

A further object of the present invention is to provide a new and novel endless drive track including a plurality of new and novel mounts for mounting a plurality of new and novel traction studs.

It is a further object of the present invention to provide a new and novel stud and stud mount of the type described which eliminates the need for a separate fastener.

A still further object of the present invention is to provide a new and novel stud mount stud and method for mounting a traction stud which utilizes a decreased number of parts to mount a traction stud on the track.

Another object of the present invention is to eliminate the need for adhesive type substance formerly used to detachably lock studs to snowmobile drive track.

The typical traction studs of the type described in the aforementioned U.S. Pat. No. 3,838,894 have a threaded mounting shank of uniform diameter disposed adjacent an enlarged intermediate flange having wrench flats for receiving a wrench for threadedly turning the stud about its axis into a stud mount.

During manufacture of an axial thread on the stud, the thread is typically rolled into the cylindrical outer surface of the stud. The rolling process includes the steps of radially inwardly rolling a thread groove into the outer surface of a cylindrical rod and concurrently radially outwardly displacing metal to form the lands of the thread which have an outer diameter slightly larger than the initial diameter of the rod. During this manufacturing process, normally an undercut is provided at the axially outer end of the thread to provide a place for the metal being displaced to pass. The root of the thread has a diameter which is less than the initial rod diameter and thus, the stud cross-section through the thread root is relatively small and is more easily fractured than is the larger diameter portions of the stud. The transverse forces set up during use sometimes causes the prior art traction studs to fail to break at the junction of the threads and the axially outwardly adjoining cylindrical shank portions. The portion of the stud immediately axially outwardly of the mounting thread is typically the weakest part of the traction stud and this typically is the portion of the stud which results in the maximum failure rate. Accordingly, it is another object of the present invention to provide a new and novel traction stud and method of making a traction stud which minimizes the failure rate during use.

Another object of the present invention is to provide a new and novel traction stud of the type described which has increased strength compared to the prior art traction studs.

A further object of the present invention is to provide a new and novel stud mount for mounting a traction stud to minimize the failure rate.

It has been found according to the present invention that providing a stud having an intermediate portion with a sidewall which diverges radially outwardly in an axial outward direction for mating with a stud mount having a complementally formed outwardly diverging skirt provides mating self-locking surfaces which will mate when the stud is threaded into the stud mount to increase stability, decrease breakage and preclude inadvertent dislodgement of the studs. Accordingly, it is an object of the present invention to provide a new and novel traction stud having a threaded mounting portion at one end thereof, a ground engaging at the opposite end and an intermediate portion which is tapered to provide a self-locking axially outwardly tapered surface for mating with a complementally formed surface on a stud mount.

A further object of the present invention is to provide a stud mount having a mounting head, an internally threaded cylinder adjacent the head and a skirt depending from the threaded portion which tapers radially outwardly in an axially outer direction for mating with a complementally formed intermediate portion of a snowmobile traction stud.

Another object of the present invention is to provide a new and novel traction stud of the type described including an intermediate shank portion which includes a sidewall that radially outwardly diverges an axially outer direction to provide a self-locking surface.

A further object of the present invention is to provide a stud mount of the type described including a skirt which presents an internal sidewall self-locking surface which has an internal diameter that radially outwardly increases in an axially outwardly direction.

A further object of the present invention is to provide a stud mount with self-locking tapered surfaces between the ends thereof.

Another object of the present invention is to provide a new and novel stud mount having an intermediate portion which radially outwardly flares in an axially outward direction.

A still further object of the present invention is to provide a traction stud having a cylindrical threaded mounting end and an intermediate self-locking portion including a radially outwardly diverging sidewall adjacent the cylindrical threaded mounting end.

A still further object of the present invention is to provide a new and improved traction stud and stud mount having complementally formed threaded mating portions for axially inwardly moving the stud when relatively turned in one direction of rotation and axially outwardly moving the stud when relatively rotated in an opposite direction, and complementally formed, tapered mating surfaces in intermediate portions of the stud and stud mount which are responsive to axially inward movement of the stud to detachably lock the stud in position and prevent reverse rotation thereof.

A further object of the present invention is to provide a new and improved traction stud of the type described having a cylindrical threaded end and an adjacent self-locking intermediate section having a breadth which is greater than the diameter of the threaded section.

Another object of the present invention is to provide a stud mount having a threaded barrel and a skirt extending from the barrel with an internal breadth which is greater than the diameter of the threaded cylinder.

Another object of the present invention is to provide a one-piece stud mount having a passage provided with a cylindrical section and an axially outer radially outwardly flaring self-locking section.

It is another object of the present invention to provide a traction stud having an intermediate self-locking portion, having the shape of a truncated cone, for detachably locking the stud to the track as it is threadedly being mounted on the track.

It is another object of the present invention to provide a traction stud mount having a threaded stud receiving cylinder and a skirt depending therefrom having the shape of a truncated cone.

It is a further object of the present invention to provide a one-piece stud receptacle having a threaded circular sidewall portion an immediately adjacent truncated cone sidewall portion.

It is another object of the present invention to provide one-piece traction stud mount including a hollow band forming a cylindrical and an adjacent truncated cone for locking the stud to a drive track.

To further stabilize the stud and stud mount, it has been found advantageous to couple the stud mount to a reinforcing bar which is embedded in the resilient drive belt. This concept is disclosed in the copending U.S. patent application of Applicants, Ser. No. 09,325,658 filed in the U.S. Patent Office on even date herewith entitled Traction Stud Mount and Method of Manufacturing, which is incorporated herein by reference as though fully set forth herein, and assigned to International Engineering and Manufacturing Inc., (hereinafter sometimes referred to as "Assignee's copending U.S. patent application).

Accordingly, it is another object of the present invention to provide a new and novel traction stud and a new and novel method of mounting the stud to a track embedded reinforcing bar.

It is another object of the present invention to provide a new and novel self-locking traction stud and stud mount which is coupled to a reinforcing bar that is embedded in a resilient endless snowmobile drive belt.

It is another object of the present invention to provide a new and novel method for manufacturing a traction stud and stud mount for an endless drive track.

It is another object of the present invention to provide a new and novel traction studded endless drive belt for a snowmobile.

It is a further object of the present invention to provide a new and novel method of manufacturing an endless drive track including a self-locking traction stud and stud mount.

It is a still further object of the present invention to provide a new and novel method of mounting a stud to an endless drive belt.

Other objects and advantages of the present invention will become apparent to those of ordinary skill in the art as the description thereof proceeds.

SUMMARY OF THE INVENTION

A one-piece traction stud having an axially inner threaded mounting end, an axially outer ground engaging end, and an intermediate self-locking section between said ends which has a breadth that gradually increases in an axially outer direction for bearing against a complementally formed surface on a stud mount for mounting the stud to the track. The invention contemplates a stud mount having a head, a threaded cylinder for threadedly receiving the threads of a snowmobile traction stud, and a self-locking skirt having a breadth which is greater than the breadth of the threaded cylinder for bearing against the complementally formed self-locking surface on the traction stud. The invention further contemplates a method of manufacturing the stud and stud mount and method of mounting a traction stud on a drive belt.

DESCRIPTION OF THE DRAWINGS

The invention may be more readily understood by referring to the accompanying drawings, in which:

FIG. 4 is an enlarged sectional end view, taken along the section line 4—4 of FIG. 2;

FIG. 5 is a greatly enlarged sectional side view, taken along the section line 5—5 of FIG. 4;

FIG. 6 is an opposite sectional side view, taken along the section line 6—6 of FIG. 4;

FIG. 7 is an end elevational view of only the stud mount constructed according to the present invention and illustrated in FIGS. 1–6;

FIG. 8 is a side elevational view of a blank of material, such as steel, utilized to manufacture the stud mount illustrated in FIGS. 6 and 7;

FIG. 9 is a greatly enlarged sectional side view illustrating an initial step in the manufacturing process of the stud shown in FIGS. 6 and 7 and more particularly illustrates the blank after it has been punched to form a stud receiving cylinder in the blank integrally coupled to oppositely extending flanges;

FIG. 9A is a sectional side view illustrating the stud in a subsequent step of manufacture with a radially outwardly flaring skirt formed therein;

FIG. 9B is a greatly reduced top plan view of the partially formed stud mount illustrated in FIG. 9;

FIG. 9C is a sectional side view illustrating a subsequent intermediate step in the manufacturing process wherein the flanges are bent into a U-shape;

FIG. 10 is a sectional side view illustrating a subsequent step in the manufacturing process and more particularly illustrates the step of forming the head by shaping the flanges to conform to the shape of a reinforcing rod embedded in the track;

FIG. 14 is a greatly enlarged sectional side view, taken along the section line 14—14 of FIG. 15, illustrating the new and improved traction stud only constructed according to the present invention;

FIG. 15 is a bottom plan view thereof;

FIG. 16 is a sectional end view of a slightly modified stud mount constructed according to the present invention;

FIG. 17 is a sectional end view of stud mount illustrated in FIG. 16 mounting a traction stud illustrated in FIG. 14 in the web of a resilient endless drive belt;

DESCRIPTION OF PREFERRED EMBODIMENT

A snowmobile drive track constructed according to the present invention, generally designated 10, includes an endless drive belt 16 trained around a pair of drive sprockets or wheels, one of which is illustrated at 12, for driving the belt 16 in endless path represented by the arrow 14. The endless belt 16 may suitably be molded from flexible or resilient material, such as rubber having a plurality of longitudinally extending polyester cords embedded therein to strengthen the track as more particularly described in the aforementioned Assignee's copending U.S. patent application filed in the U.S. Patent Office on even date herewith entitled Traction Stud Mount and Method of Manufacturing. As more particularly disclosed therein, inner and outer cloth layers may be disposed on inner and outer sides of the band of polyester cords to sandwich the cords therebetween.

Figure 1:
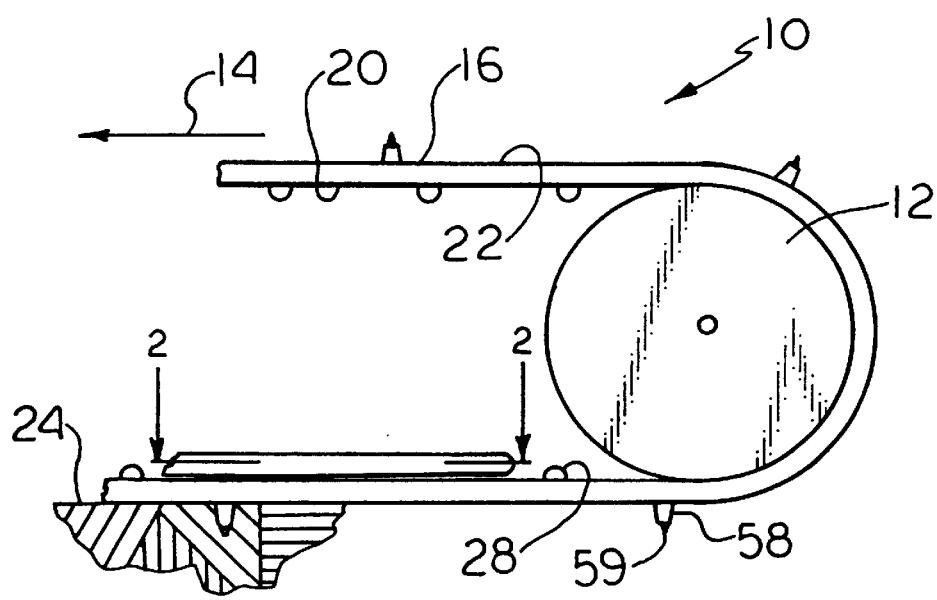
FIG. 1 is a side elevational view of an endless snowmobile drive track incorporating a stud mount constructed according to the present invention mounting a stud constructed according to the present invention, with the ground surface being traversed being broken away in section.
Figure 2:
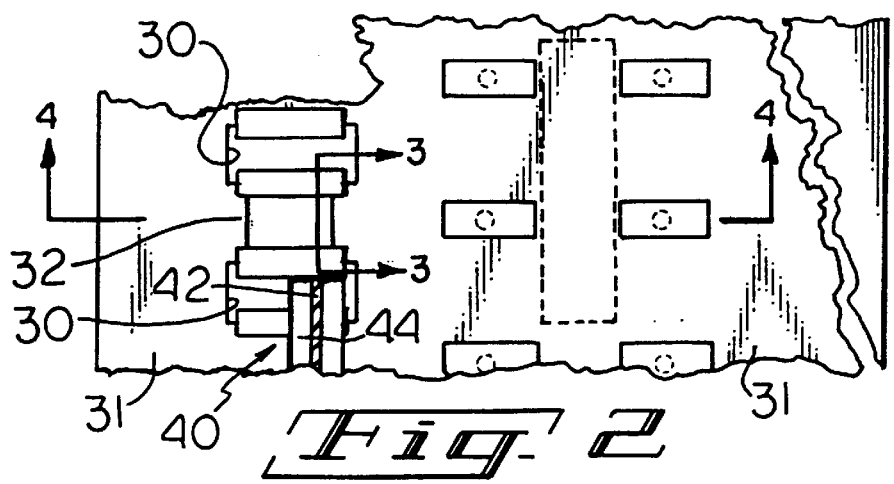
FIG. 2 is a fragmentary plan view, of the lower run of the endless track taken along the section line 2—2 of FIG. 1.
Figure 3:
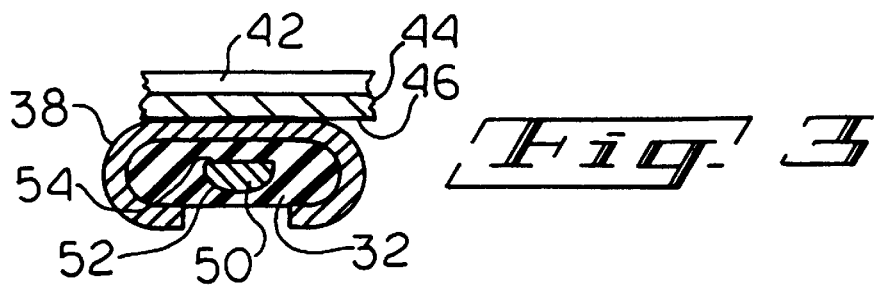
FIG. 3 is an enlarged sectional side view, taken along the section line 3—3 of FIG. 2, more particularly illustrating a track clip mounted on a portion of the track which receives a reinforcing bar.

The belt 16 includes an inner face 20 and an outer face 22 which, as it passes along the lower run of the belt, engages a surface 24 to be traversed. The inner track surface 20 integrally mounts spaced apart pairs of laterally spaced drive lugs 28 which are spaced along the length of the inside of the belt 16 for engaging the drive wheels 12 as usual. The belt 16 includes a plurality of endless parallel belts 31 of differing widths coupled together by integral belt coupling sections or bars 32 to form a plurality of longitudinally spaced apart, longitudinally aligned windows or openings 30 which pass between the inner and outer surfaces 20 and 22. Mounted on the track coupling sections 32 are generally U-shaped outwardly opening, metal track clips 38 on which snowmobile mounted gliders or rails, generally designated 40, bear. The glider 40 includes an upstanding plate 42 dependently mounting a longitudinal flat wear bar 41 having an under surface 46 which bears against the upper surfaces of the track clips 38 as illustrated in FIGS. 3 and 4.

The track windows 30 allow snow on the surface 24 being traversed to enter and pass between the glider wear bar 44 and the track clips 38 to provide lubrication therebetween to cool the track.

Embedded in the belt coupling sections 32 of the track 16 and spanning the adjacent parallel belts 31 is a plurality of spaced apart, transversely extending reinforcing rods or bars 50 which, as illustrated in FIG. 5, have a generally semi-cylindrical shape including a semi-circular outer surface 52 and a flat inner side surface 54. The bars or rods 50 made suitably comprise fiberglass resin.

The outer track surface 22 mounts a plurality of rows 58 of traction lugs 59 integrally formed with the track 16. These traction lugs 59 engage the surface 24 and snow for increasing traction.

The construction described heretofore is conventional.

A plurality of new and novel one-piece stud mounts, generally designated 60, are mounted in the drive belt 16 for detachably mounting a plurality of new and novel traction studs, generally designated 90, constructed according to the present invention.

The Traction Stud

Referring initially more particularly to FIGS. 14 and 15, a traction stud, constructed according to the present invention, generally designated 90, includes an elongate shank, generally designated 88, having an axially inner thread end section 89, an axially outer radially inwardly tapering end section 101 having a ground engaging terminal stud end, generally designated 92, for engaging the surface 24 to be traversed and an integral central flange, generally designated 91, which has wrench flats 94 for turning the stud about its axis 95 to thread the cylindrical threaded end 89 into the stud mount 60. The tapering end section 101, which is axially outward of the flange 91 and has the shape of an inverted cone, includes a sidewall 107 which radially inwardly converges in an axially outward direction.

The outer terminal stud end 92 has an elongate, outwardly opening elongate recess 96 cut therein for receiving a hardened carbide cylindrical rod, generally designated 98, having a cylindrical body 100 and a cone shaped outer end 102 terminating in a sharp tip 104 for engaging the surface 24 to be traversed. Before inserting the carbide rod 100 into the opening 96, the stud 90, is inverted from the position illustrated in FIG. 14 and partially filled with liquid solder before the carbide tip 100 is inserted therein to secure the outer surface 103 of the carbide rod 100 to the lower stud end 92.

The traction stud 90 includes an intermediate self-locking portion, section or member, generally designated 106, between the threaded end section 89 and the terminal end 92 for detachably locking the stud 90 to the traction stud mount, generally designated 60. The self-locking section 106 is disposed between the threaded end 89 and the wrench flange 91 and has the frusto-conical shape of a frustum or a truncated cone. The self-locking section 106 includes an outer sidewall surface 108 which is non-threaded and diverges radially outwardly in an axially outer direction away from the threaded end section 89. The radially outer surface 108 tapers or is inclined radially outwardly in an axially outer direction relative to the axis 95 to provide a smooth non-threaded locking surface for detachably locking to the stud mount 60 in a manner to become more readily apparent hereinafter.

It should be noted that the thread 86 has an axial length 77 and an outside diameter 114. The axial length 79 of the locking section and the axial length 81 of locking surface 108 is each substantially greater than the thread length 77. The axial outer end 109 of locking member 106 has an external diameter 110 which is substantially greater than the axial outer diameter 112 of the axially inner end 113 of the locking surface 109. The axially inner diameter 112 is substantially equal to the outer diameter 114 of the thread 86. Accordingly, the outer surface 108 has a substantially larger bearing area than the area of the outer surface of the cylindrical threaded end section 89. This large bearing area absorbs much of the lateral or transverse force exerted on the stud 90 and thus reduces the transverse force which would otherwise be exerted on the thread 89.

The stud 90 is manufactured from an elongate rod or bar stock having an outside diameter at least as large as the maximum width of wrench flange 91 and the flats 94 are cut therein.

The axially inner portion of the bar stock is radially inwardly reduced or cut away to provide the axially inwardly converging sidewall surface 108 and the axially inner cylindrical end section 89.

The axially outer section 101 is also radially inwardly reduced or cut away in an axially outer direction to provide the oppositely tapered ground engaging portion with a radially inwardly converging sidewall 107.

The cylindrical end section 89 is externally threaded at 86 and an elongate, a cylindrical carbide tip receiving hole 96 is drilled along stud axis 95 into the axially outer terminal stud end 92. The stud 90 is inverted, liquid solder is disposed in opening 96 and the sharpened carbide rod 100 is inserted therein. The liquid solder is forced axially outwardly between the rod 100 and the recess 99 to coat the outer surface 103 of carbide rod 100 causing it to adhere to the confronting portions of the outer stud section 101.

The Traction Stud Mount

The one-piece traction stud mount, generally designated 60, constructed according to the present invention, includes a longitudinally extending receptacle, generally designated 61 (FIG. 6), and an integral stud mounting head, generally designated 74. The receptacle 61 is formed from an annular band 63 (FIG. 9) of steel or other suitable material which, at its axially inner end, includes a cylinder or barrel 62 internally threaded at 64 for receiving a complementally threaded end 89 of the stud 90. The annular band 63 also includes an axially outer, integral self-locking skirt 66 which is in the shape of a truncated cone and formed complementally to the outer self-locking surface 108 of the traction stud 90.

As illustrated, the sidewall 67 forming the skirt 66 diverges radially outwardly in an axially outer direction to present an inner sidewall surface 68 which also diverges radially outwardly in an axially outer direction. The inner surface 68, although tapering or flaring radially outwardly in an axial outer direction, is smooth and presents a locking surface for mating with the smooth tapering surface 108 of the stud mount 90 as the stud is being translated axially inwardly (arrow I) as the stud 90 is rotated clockwisely, about its axis 95, in the direction of the arrow C, to detachably prevent the stud 90 from reversely rotating in the opposite direction represented by the arrow CC (FIG. 15).

Such locking surfaces are sometimes referred in the machine tool art as having a "morse taper". The skirt 66 and the locking member 106 cooperate to absorb a substantial portion of any transverse force exerted on the traction stud 90 mounted in the traction stud mount 60. This reduces the transverse force which would otherwise be exerted on the thread 86 that sometimes results in the failure of the prior art traction studs.

The axially outer section 99 of the skirt 66 includes a sidewall 67 which is axially outwardly flaring or tapered to provide a locking surface for locking the stud 90 into the stud mount without the necessity of any lock nuts or LOC-TITE adhesive.

The axially outer terminal end 70 of skirt 66 has an inner diameter 71 which is substantially equal to the axially outer diameter 110 of the confronting portion of locking surface 108 and is substantially larger than the internal diameter 72 of the axially inner end 73 of the skirt 66. The internal diameter 72 is substantially equal to the outer diameter 112 of the axially inner end 113 of stud locking section 106. The mating surfaces 68 and 108 are thus complementally formed to provide substantial, complementally formed locking surfaces which are forced together with a compression fit as the stud 90 is rotated to axially inwardly displace the stud mount 60. As the stud 90 is rotated in the direction of the arrow C (FIG. 15), the relatively large bearing surfaces 68 and 108 are axially forced together into confronting, abutting relation with a compression fit to hold the stud 90 in its axial inner position illustrated in FIGS. 6 and 17 to prevent reverse rotation thereof in the direction of the arrow CC (FIG. 15).

The stud mount 60 includes an axially inner mounting head, generally designated 74, disposed transverse to, but integral with, the stud mounting cylinder 62. The mounting head 74 includes a pair of oppositely extending integral flanges 75 each having a radially inner portion 76 (FIG. 9) which is integrally formed with the axially inner end 78 of the stud mounting cylinder 62. The head flanges 75 include intermediate flange portions 77 which are displaced to a curvilinear shape, illustrated in FIG. 6, conforming to the outline of the underside 52 of the reinforcing bar 50. The flanges 75 also include upper outer flange portions 80 which are folded inwardly toward each other to the confronting, co-planar positions, illustrated in FIG. 6, so that the terminal ends 82 thereof are in abutting or confronting relation welded at 84.

As illustrated, the flanges 75 are oppositely folded toward each other to conform to the semi-cylindrical shape or outline 52, 54 of the reinforcing rods 50. The intermediate flange portions 77 conform to the shape of the curvilinear outline of rod surface 52 and the outer flange portion 80 are disposed in the same plane for bearing against the planar surface 54. The flanges 75 cooperate to define a transversely extending passage 85, having a transverse axis 79, which is transverse to the stud receiving barrel opening 63 and axis 73. The completed stud mount 60 is slid over a reinforcing rod 52 which is subsequently embedded in the formation of the resilient rubber track 16.

The Method of Manufacturing and Mounting

A stud mount 60 is formed from a metal blank or sheet 86 (FIG. 8) which is drawn, punched and displaced from the planar condition illustrated in FIG. 8 to the altered condition illustrated in FIG. 9 to form a right circular cylinder 116 having oppositely disposed integral flanges 75. The axially outer end 99 of right circular cylinder 116 is then roll formed from the position illustrated in FIG. 9 to the truncated cone shaped position illustrated in FIG. 9A to provide the skirt 66 whereas the remaining portion 62 of the light circular cylinder 116 retains its right circular cylinder shape. The cylinder 62 thus defines the elongated stud receiving passage 63.

The inner cylindrical surface of the cylinder 62 is threaded, with a thread 64 that is complemental to the thread 86 on the traction stud 90. The flange 75, which is initially circular, as illustrated in FIG. 9B, is cut along the chain lines L8, L9, L10 and L11, to provide a rectangularly shaped head as viewed at H in FIG. 9B. The flanges 75 are then displaced into the U-shape as illustrated in FIG. 9C so that the intermediate flange portion 77 is shaped to conform to the lower outline 52 of the transverse reinforcing bar 50. The terminal flange ends 82 are then folded inwardly to the coplanar, confronting positions illustrated in FIG. 10.

Figure 11:
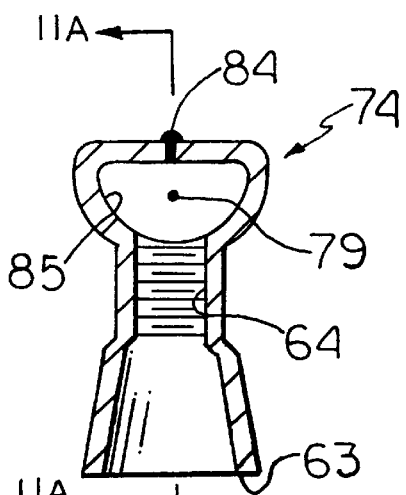
FIG. 11 is a sectional side view illustrating a subsequent welding step in the manufacturing process and more particularly illustrates the adjacent terminal ends of the head flanges welded together.
Figure 12:
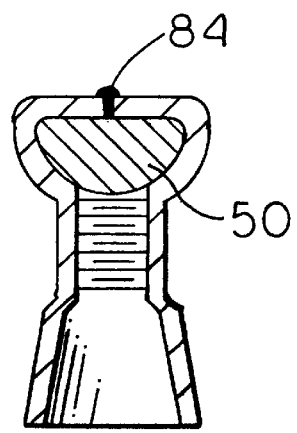
FIG. 12 is a sectional side view illustrating a subsequent step of assembling the stud mount on a transverse rod prior to molding the drive belt at which time the rod and mounting head are embedded in a band of resilient material, such as rubber.
Figure 11A:
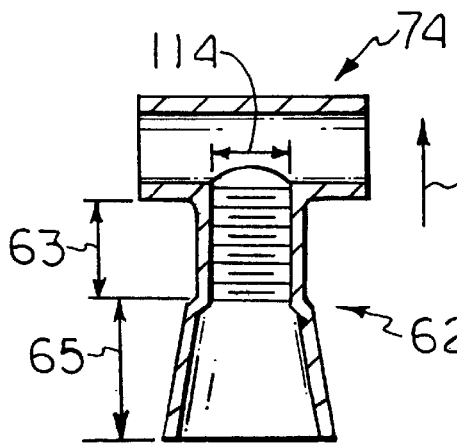
FIG. 11A is a section end view of the stud mount only, taken along the section line 11A—11A of FIG. 11.
Figure 13:
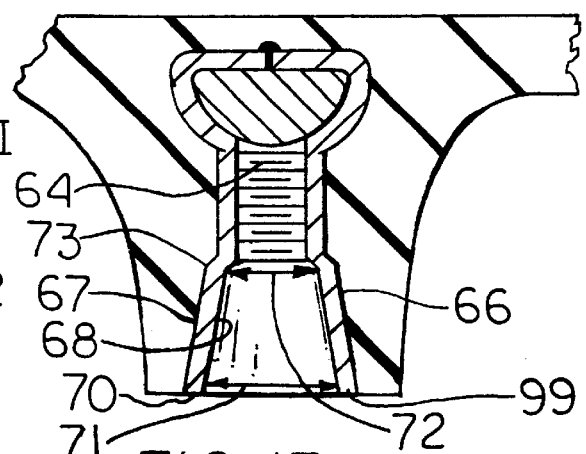
FIG. 13 is an enlarged sectional side view, similar to FIGS. 6 and 12 but illustrating a new and improved stud mount embedded in a resilient drive belt, such as rubber, forming an endless drive track.

The abutting or confronting ends 82 may then be welded via a weld bead 84 (FIG. 11) to complete the transverse mounting passage 85 which extends transversely to the opening 63 in the stack or barrel 62. The completed stud mount 60 is then mounted on a transverse reinforcing bar 50 (FIG. 12) by sliding it axially along the length of the bar 50 to a position in which it will be aligned with one of the track drive lugs 59 to be subsequently integrally molded in the track 16. The stud mounts may vary in number and location but are disposed in predetermined patterns so that the studs do not follow in the same track.

The flanges 75 may also be "under-folded" or over folded as more particularly described in the aforementioned Assignee's copending U.S. patent application filed in the U.S. Patent Office on even date herewith entitled Traction Stud Mount and Method of Manufacturing Bands of polyester cords and the cloth layers (not shown) which sandwich the cords therebetween may suitably be disposed along the inner sides of the reinforcing bars and the stud mounts and an additional cloth layer may be disposed on the outer curvilinear sides of the reinforcing bars 50 as recited in more detail in Assignee's aforementioned copending U.S. patent application filed on even date herewith. An endless layer or belt 16 of rubber is molded about the polyester cords, the reinforcing bars 50, the mounting heads 74, and the stud mounting cylinders 62. The outer terminal ends 87 of the stud mounting cylinders 62 are substantially flush with the outer track surface 22 on lugs 59 to enable easy access to the cylinder openings 63.

Each traction stud 90 is then rotatably threaded into a stud mount cylinder 62, in the direction of the arrow C, to axially inwardly move the stud 90, in the direction of the arrow I, until the stud locking surface 108 is axially forced, with a compression fit, into frictional locking engagement with the truncated cone shaped surface 68 of the skirt 66. This interlocking movement of the two bearing surface 68 and 108 will self-lock the stud 90 in its axially inner position illustrated to preclude the reverse rotation thereof without the necessity of any additional fasteners.

As illustrated in FIG. 6, when the stud 90 is fully threaded and locked in the stud mount 60, the lower terminal end 70 of skirt 66 is axially spaced from the upper surface 93 of flange 91 so that the flange 91 does not "bottom out" against the terminal end 70 and, if desired, a nylon washer (not shown) may be inserted therebetween to additionally aid the locking of the stud 90 in position as necessary. Such stud insertion may be occasioned during track manufacture or, if desired, subsequently by a snowmobile retailer or the end user.

Preferably, some of the stud mounts 60 are placed in close proximity to the track windows 30 and to the track clips 38 where substantial heat is generated as a result of the friction between the track clips 38 and the wear rails 42. The rods 52, which are manufactured from fiberglass resin, may deteriorate or "break down" if the rod 52 becomes too hot. Accordingly, the stud mount 60 functions as a radiator for cooling the track and the reinforcing bars. As illustrated in FIGS. 1–17, the thicknesses of blank 86, the wall of cylinder 62, and flanges 75 are substantially uniform such that the opposing surfaces thereof are substantially equidistically spaced apart throughout their respective lengths.

When the track molding operation is completed, the assembly will appear as illustrated in FIGS. 4 and 6.

The increased breadth, represented by the arrows 110 and 112 of the locking member 108 relative to the breadth 114 of the threads 89 provides a substantially broadened base for the stud mounting end of the stud which greatly increases the strength of the stud and provides an increased bearing surface for locking against the skirt. The new and novel stud mount thus increases the strength of the stud and is self-locking to eliminate the prior art requirement of a separate locking fastener.

Alternate Embodiment

Referring now more particularly to FIGS. 16 and 17, a slightly modified stud mount 60A, generally similar to stud mount 60, is illustrated and generally similar parts will be referred to by generally similar reference characters followed by the letter A subscript.

The stud mounting head 74A differs from the stud mounting head 74 in that the flanges or strips 75A are not cut or folded but rather remain in the same plane. Rather than being disposed in the section of the track in which lugs 59 are formed, the stud mount 60A are mounted in the reduced thickness portion 16A between the traction lugs. The flanges 75A may be molded into the track 16A flush with the inner track surface 20A and the terminal end 70A of the skirt 66A disposed flush with the outer track surface 22A. The axially inner threaded end 89A can pass axially inwardly thru the open-ended threaded cylinder 62A, if desired.

Another Modified Embodiment

Figures 18, 19:
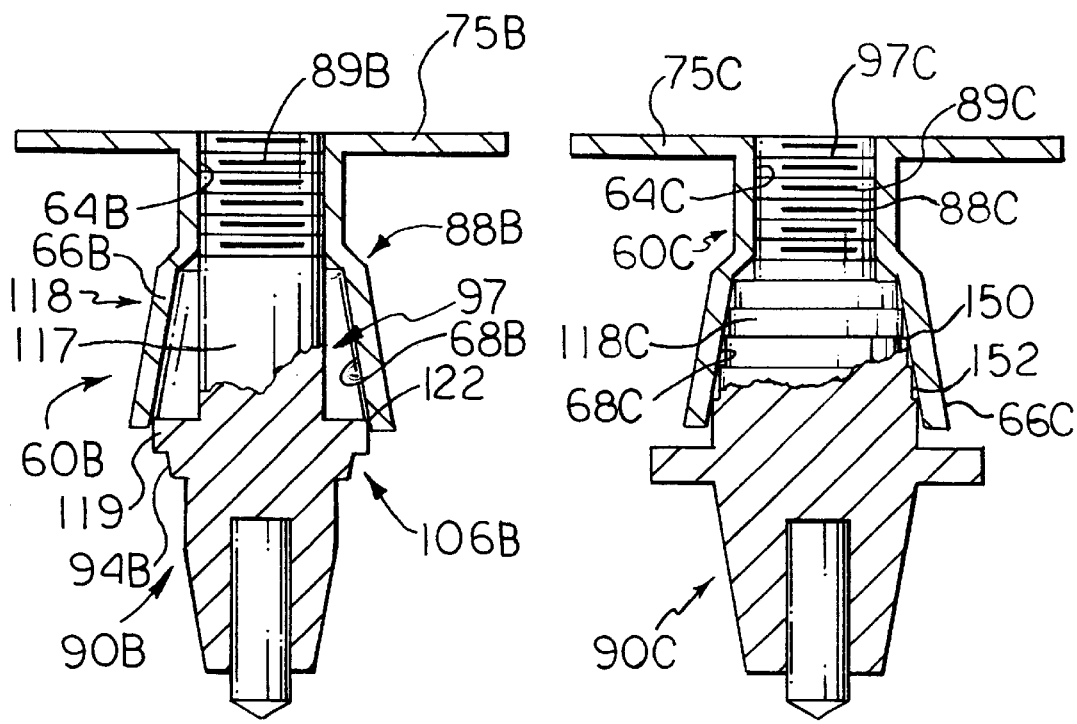
FIG. 18 is a sectional end of another slight modified stud and stud mount constructed according to a slightly modified embodiment of the present invention.
FIG. 19 is a sectional end view of yet another slightly modified stud and stud mount constructed according to another slightly further modified embodiment.

Referring now more particularly to FIG. 18, the slightly modified traction stud, generally designated 90B, is illustrated with a traction stud mount 60B which is basically identical to the traction stud mount 60A. The traction stud 90B is similar in many respects to the traction stud 90 and generally similar reference characters and generally similar parts will be referred to by generally similar reference characters followed by the letter B designation.

The traction stud 90B differs in that the upper stud portion 97 includes a shank 88B having an axially inner, externally threaded end section 89B and an axially outer non-threaded section 118. The non-threaded section 118 includes an axially inner section 117 having a diameter substantially equal to the inner diameter of the threaded end section 89B. The self-locking section non-threaded section 118 also includes an axially inner outer enlarged diameter cylindrical step section 119. The axially cylindrical step section 119 includes an annular outer edge 122 which bears against the inner surface 68B of the lower portion of the skirt 66B with a line contact. Wrench flats 94B are formed into the stud axially outwardly adjacent the cylindrical step 119.

Another Modified Embodiment

Referring now more particularly to FIG. 19, a slightly modified traction stud, generally designated 90C is illustrated with a stud mount 60C which is generally similar to the traction stud mount 60A. The traction stud 90C is similar in many respects to the traction studs 90 and 90B and generally similar parts will be referred to by generally similar reference characters followed by the letter C designation.

The traction stud 90C differs in that the upper stud portion 97C includes the shank 88C having an axially inner threaded end section 89C and an axially outer non-threaded cylinder generally designated 118C, having a plurality of cylindrical steps, generally designated 150, of progressively increasing diameters in an axially outer direction. Each cylinder 150 has an annular edge 152 which forms line contact with the inside skirt surface 68C of the skirt 66C.

Further Modified Embodiment

Figure 20:
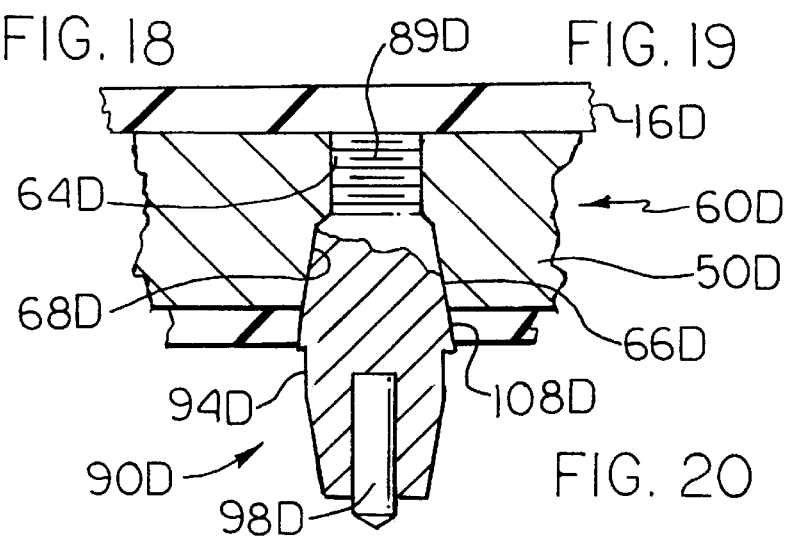
FIG. 20 is a sectional end view illustrating still another slightly modified embodiment wherein the stud mount is formed in a track embedded reinforcing bar.

Referring now to FIG. 20, a slightly further modified traction stud mount, generally designated 60D is illustrated and generally similar parts are referred to by generally similar reference characters followed by the letter D subscript. The stud mount 60D which comprises a fiberglass reinforcing bar 50D embedded in the track 16D. The bar 50D has a threaded receptacle 64D and a non-threaded skirt portion 66D which diverges radially outwardly in an axially outward direction to providing a bearing surface against the tapered frusto-conically shaped surface 180D of stud 90D bears.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A one-piece elongate traction stud, having an elongate axis, for an endless snowmobile drive belt or the like comprising:
   an axially inner cylindrical mounting end section for detachably mounting to said endless drive belt,
   an axially outer, ground engageable end, and
   self-locking means, which radially outwardly diverges in an axially outer direction, axially outwardly of said cylindrical mounting end section for bearing against a complementally formed axially outwardly diverging portion surface on said snowmobile drive belt.

2. The one-piece traction stud set forth in claim 1 wherein said axially inner cylindrical mounting end section comprises an axially extending external thread having a predetermined axial length; said sidewall section having a greater predetermined axial length which is greater than said predetermined length.

3. The one-piece traction stud set forth in claim 1 wherein said cylindrical mounting end comprises an externally thread of predetermined diameter and predetermined length, said self-locking means comprises a sidewall section having a breadth which exceeds said predetermined diameter of said thread.

4. A one-piece stud mount, having an elongate axis, for detectably mounting a traction stud on an endless snowmobile drive belt, having inner and outer surfaces, said stud mount comprising:
   an elongate hollow one-piece endless annular band of material, having an elongate axis, including
   an axially inner, hollow, cylindrical mounting section formed about said elongate axis and adapted to be embedded in said drive belt; and
   an axially outer skirt, axially outward of said axially inner, hollow cylindrical mounting section, which radially outwardly flares in an axially outer direction relative to said axially inner mounting section, for bearing against a complementally formed portion of said traction stud.

5. The one-piece stud mount set forth in claim 4 wherein said cylindrical mounting section includes an internal thread having a predetermined diameter and a predetermined length; said skirt having a predetermined greater length which is greater than said predetermined length.

6. The one-piece stud mount set forth in claim 5 wherein said skirt has a diameter which gradually increases in an axially outer direction.

7. The one-piece stud mount set forth in claim 5 wherein said skirt has a frusto-conical shape.

8. The one-piece stud mount set forth in claim 4 wherein said axially inner mounting section is internally threaded for receiving a complementally threaded inner end of said traction stud.

9. A one-piece stud mount for mounting a traction stud, having a radially outer locking surface thereon, to an endless snowmobile drive belt said stud mount comprising:
   a one-piece member defining an elongate hollow passage therein, said passage having an elongate axis;
   said passage including
      an axially inner internally threaded cylindrical sidewall for detachably, threadedly receiving an externally threaded portion of a traction stud; and
      axially outer, self-locking sidewall means, axially outward of said axially inner threaded cylindrical sidewall, which diverges radially outwardly in an axially outward direction relative to said axially inner threaded cylindrical sidewall for bearing against a locking surface portion on said traction stud as said traction stud is threaded in one direction into said cylindrical sidewall to frictionally engage said locking surface portion and detachably inhibit said traction stud from being reversely rotated.

10. The one-piece stud mount set forth in claim 9 wherein said cylindrical sidewall has a predetermined internal diameter and predetermined length, said self-locking sidewall means having a predetermined greater axial length which is greater than said predetermined length.

11. The one-piece stud mount set forth in claim 10 wherein said cylindrical sidewall has an internal diameter which is greater than said predetermined diameter and gradually increases in an axially outer direction.

12. The one-piece stud mount set forth in claim 11 wherein said sidewall is non-threaded and provides a smooth, uninterrupted bearing surface for bearing against a complementally formed, smooth bearing surface on said stud.

13. A one-piece traction stud mount for detachably mounting an elongate traction stud, having an elongate axis of rotation and threaded and unthreaded portions, on an endless drive track, said stud mount comprising:
   a hollow stud receptacle having an axially extending, circular, threaded sidewall, provided with axially inner and outer ends, for threaded rotatably receiving a threaded portion of a traction stud to
      axially relatively move said stud and said stud mount toward each other when said stud and stud mount are relatively rotated in one direction, and
      for axially relatively moving said stud and said stud mount away from each other when said stud and stud mount are relatively reversely rotated in an opposite direction;
   said stud receptacle including an axially outer, axially outwardly extending truncated cone shaped, unthreaded sidewall having an axially inner, small diameter end, axially outwardly adjacent said axially outer end of said threaded sidewall and an axially outer, large diameter, terminal end, larger than said axially inner small diameter end.

14. The one-piece traction stud mount set forth in claim 13 wherein said threaded sidewall has a predetermined axial length, said truncated cone shaped sidewall having an axial length which is greater than said predetermined length of said threaded sidewall.

15. The one-piece traction stud mount set forth in claim 13 wherein said circular threaded sidewall has a predetermined diameter, said small diameter end having a diameter at least as great as said predetermined diameter of said threaded sidewall.

16. A one-piece traction stud mount for detachably mounting an elongate traction stud, having an elongate axis of rotation and threaded and unthreaded portions, on an endless drive track, said stud mount comprising:
   a hollow stud receptacle, adapted to be at least partially embedded in an endless drive track, having
      a circular cylindrical internal sidewall surface of predetermined internal diameter and with axially inner and outer ends, and
      a truncated cone shaped internal sidewall surface axially outwardly of said outer end of said circular cylindrical internal sidewall surface including
         a relatively small diameter circular end, having a first diameter substantially equal to said predetermined diameter, making a smooth relatively uninterrupted transition from said axially outer end of said cylindrical sidewall surface, and
         an axially opposite, relatively large diameter circular end of substantially greater predetermined diameter which is greater than said first diameter;
   said internal sidewall surface being threaded to threadedly receive a threaded portion of a traction stud.

17. A one-piece traction stud comprising:
   an elongate shank having
      an axially inner, threaded mounting end for mounting on an endless drive track,
      an opposite ground engageable end, and
      an intermediate portion, between said ends, axially outwardly adjacent said threaded mounting end;
   said threaded mounting end including an externally threaded section of a predetermined axial length;
   said intermediate portion comprising a truncated cone having
      a relatively small diameter circular end, integral with said mounting portion, having a relatively small diameter substantially equal to said predetermined diameter and
      an axially opposite, relatively large diameter circular end of substantially greater diameter.

18. A one-piece traction stud mount for detachably mounting a rotatable traction stud having threaded and non-threaded portions on an endless drive track, said stud mount comprising:
   a hollow, internally threaded, circular cylinder, having opposite ends, for threadedly, rotatably receiving a threaded portion of a traction stud to axially relatively move said stud and stud mount toward each other as said stud and stud mount are relatively rotated in one direction of rotation and for axially relatively moving said stud and stud mount in an opposite direction of rotation when said stud and stud mount are relatively rotated in an opposite direction; and
   a hollow truncated cone integrally coupled to one end of said cylinder for receiving and bearing against said non-threaded portion of said stud as said stud and stud mount are relatively rotated in said one direction to detachably lock said stud to said stud mount and inhibit relative rotation of said stud and stud mount in said opposite direction.

19. The stud mount set forth in claim 18 wherein said cylinder has a predetermined internal diameter and said truncated cone has one end having an internal diameter substantially equal to said predetermined diameter integrally coupled to said one end of said cylinder and an opposite circular end of substantially greater diameter substantially which is greater than said predetermined diameter.

20. The stud set forth in claim 19 wherein said truncated cone includes a sidewall with a gradually increasing diameter between said one end and said opposite end of said core.

21. A traction stud for mounting on an endless drive track comprising:
an elongate shank, having an elongate axis, including
an axially inner end of predetermined diameter for mounting in an endless drive track;
an axially outer ground engageable end, and
an intermediate stud locking section, between said ends, having axially spaced annular portions of progressively increasing diameter, in an axially outer direction, greater than said predetermined diameter for frictionally engaging a complementally formed stud mounting portion of said track.

22. The one-piece traction stud set forth in claim 21 wherein said axially inner end includes an external thread of predetermined axial length for threading into a complementally threaded stud mounting portion of said track; said stud locking section comprising an annular sidewall which diverges radially outwardly in an axially outer direction.

23. The one-piece traction stud set forth in claim 22 wherein said annular sidewall includes an axially innermost end having a diameter substantially equal to said predetermined diameter.

24. The one-piece traction stud set forth in claim 23 wherein said sidewall has an axial length which is greater greater than said predetermined axial length of said thread.

25. In combination:
a one-piece elongate traction stud having an elongate axis, for an endless drive track including
an axially inner externally threaded mounting end,
an axially outer ground engageable end, and
an intermediate section between said ends having an axially outer portion;
a one-piece stud mount for mounting said traction stud on said endless drive track comprising a hollow annular band including
an axially inner, internally threaded circular cylindrical section of predetermined diameter for threadedly receiving said externally threaded mounting end to relatively move said stud and said stud mount toward each other when relatively rotated about said axis in one direction and to relatively axially move said stud and said stud mount away from each other when reversely rotated in an opposite direction, and
an axially outer, self-locking member;
said axially outer portion of said intermediate section of said stud and said axially outer member of said stud mount including complementally formed self-locking surfaces which have a breadth greater than said predetermined diameter and which frictionally mate when said stud and said stud mount are relatively rotated in said one direction to inhibit said stud and said stud mount from being reversely rotated in said opposite direction.

26. The combination set forth in claim 25 wherein said intermediate section includes axially spaced annular portions of progressively increasing diameters in an axially outer direction.

27. The combination set forth in claim 25 wherein said intermediate section comprises an annular sidewall which diverges radially outwardly in an axially outer direction.

28. The combination set forth in claim 25 wherein said intermediate section comprises an outer surface which tapers radially outwardly in an axially outer direction to provide a tapering surface for bearing against said axially outer self-locking member of said stud mount.

29. The combination set forth in claim 25 wherein said intermediate section of said stud and said axially outer portion of said stud mount include complementally formed portions which are inclined radially outwardly in an axially outer direction.

30. The combination set forth in claim 25 wherein said complementally formed self-locking surfaces have complementally formed diameters which progressively increase in an axial outer direction.

31. The combination set forth in claim 25 wherein said complementally formed self-locking surfaces flared radially outwardly in an axially outer direction.

32. The combination set forth in claim 25 wherein said self-locking surface of said stud comprises a sidewall section which diverges radially outwardly in an axially outer direction and said self-locking surface of said stud mount comprises an annular sidewall which flares radially outwardly in an axially outer direction complemental to said sidewall section of said stud for frictionally receiving said sidewall section of said stud.

33. The combination set forth in claim 32 wherein said sidewall section has a predetermined axial length; said sidewall section and said annular sidewall each having an axial length which is greater than the axial length of said externally threaded mounting end of said traction stud.

34. The combination set forth in claim 25 wherein said axially outer self-locking member of said stud mount has the shape of a truncated cone.

35. A stud mount for mounting a traction stud on an endless drive belt having at least one reinforcing rod embedded therein, said stud mount including
a cylindrical barrel, adapted to be disposed in said endless drive belt, having inner and outer ends and an axis and defining a first opening therethrough;
said barrel being internally threaded for threadedly detachably mounting said traction stud; and
locking means mounted on said outer end of said barrel and responsive to axial movement of said stud toward said mount as said stud is threaded into said barrel in one direction of rotation for bearing against a portion of said stud and detachably frictionally locking said stud to said mount.

36. The stud mount set forth in claim 35 wherein said locking means comprises an annular flange, which radially outwardly diverges in an axially outward direction, integral with said outer end of said barrel.

37. The stud mount set forth in claim 36 wherein said flange has the geometrical shape of a frustum.

38. The stud mount set forth in claim 36 wherein said flange is non-threaded.

39. The stud mount set forth in claim 35 wherein said locking means comprises an annular sidewall which outwardly diverges in an axially outer direction.

40. The stud mount set forth in claim 35 wherein said locking means has a geometrical shape of a frustum integrally coupled to said outer end of said threaded barrel.

41. The stud mount set forth in claim 35 wherein said locking means comprises an annular wall which has the geometrical shape of a frustum integral with said outer end of said barrel.

42. The stud mount set forth in claim 35 including mounting head means mounted on said inner end of said barrel for mounting said barrel on said reinforcing rod.

43. The stud mount set forth in claim 42 wherein said mounting head means extends transversely to said barrel.

44. The stud mount set forth in claim 43 wherein said mounting head means comprises a hollow band integral with said barrel, having a second opening therein, and extending transversely to said first opening for being snugly received on said reinforcing rod.

45. The stud mount set forth in claim 44 wherein said mounting head means includes a transverse opening therein, transverse to said first opening, having an outline shaped complementally to said outline of said predetermined reinforcing rod for mating therewith.

46. The stud mount set forth in claim 45 wherein said mounting head means comprises a hollow band integrally coupled to said cylindrical barrel, defining said transverse opening therein, and extending transversely to said first opening for being received on said reinforcing rod.

47. The stud mount set forth in claim 46 wherein said hollow band comprises a hollow elongate cylinder having a sidewall extending normal to said barrel.

48. The stud mount set forth in claim 35 wherein said mounting head means is integral with said barrel and includes a pair of confronting flanges each including an opening therein for receiving said rod.

49. The stud mount set forth in claim 48 wherein said flanges each include a transversely extending ear integral with the flange adjacent said opening therein for bearing against said rod.

50. The stud mount set forth in claim 49 wherein said flanges are generally parallel to each other and said ears extend normal to said flanges.

51. A stud mount for mounting a traction stud on an endless resilient belt having inner and outer surfaces with at least one opening provided in said outer surface and at least one reinforcing rod embedded in said belt adjacent said one opening, said stud mount including:
a hollow elongate member, adapted to be disposed in said opening, having a longitudinal axis, including
an axially inner, hollow internally threaded cylinder for threadedly detachably mounting said traction stud; and
axially outer stud locking flange means, integral with said cylinder, radially outwardly diverging in an axially outer direction relative to said cylinder for bearing against a portion of said stud and detachably locking said stud to said flange means in response to axial inward movement of said stud as said stud is being turned about said axis in one direction of rotation to inhibit rotation of said stud in an opposite direction of rotation opposite said one direction.

52. The stud mount set forth in claim 51 wherein said stud locking flange means comprises an annular sidewall having the geometrical shape of a frustum.

53. The stud mount set forth in claim 51 wherein said locking flange means comprises an annular sidewall having a frusto-conical shape.

54. In combination:
an endless resilient drive belt for propelling a snowmobile along a surface;
traction increasing means for increasing the traction of said drive belt comprising:
a one-piece elongate snowmobile traction stud, having
an elongate axis, including
an axially inner mounting end,
an axially outer end for engaging said surface, and
an intermediate section between said ends;
a one-piece annular stud mount for mounting said stud on said track including
an axially inner section of predetermined breadth for internally receiving said axially inner mounting end, and
an axially outer section;
said intermediate section of said stud and said axially outer section of said stud mount having complementally formed mating surfaces, with a breadth which is greater than said predetermined breadth, for detachably locking said stud to said stud mount.

55. The combination set forth in claim 54 wherein said intermediate section and said axially outer section include complementally formed sidewall surfaces each of which diverges radially outwardly in said axially outer direction.

56. The combination set forth in claim 55 wherein said axially inner section of said stud mount comprises an internally threaded cylinder of uniform internal diameter and said axially outer section of said stud mount comprises an annular sidewall, having an axially inner end integrally with said internally threaded cylinder and an axially outer terminal end, having an internal diameter which is greater at said axially outer end thereof than at said axially inner end thereof.

57. The combination set forth in claim 56 wherein said annular sidewall has an internal diameter which progressively increases between said inner end thereof and said outer end thereof.

58. The combination set forth in claim 57 wherein said axially inner mounting end and said axially inner section are complementally threaded; said complementally formed mating surfaces each having a breadth which increases in an axially outer direction.

59. A method of manufacturing a one-piece traction stud mount for detachably mounting a one-piece traction stud to an endless drive track comprising the steps of:
selecting a blank of material having a mid-portion and an outer portion surrounding said mid-portion;
forming a mid-portion of said blank into a cylindrical stud receiving cylindrical receptacle having axially inner and outer ends;
forming a mounting head in said outer portion of said blank of material integral with said axially inner end of said cylinder; and
forming a skirt in the axially outer end of said cylinder which diverges radially outwardly, relative to said axially inner end, in an axially outer direction to provide a self-locking surface for mating with a complementally formed surface on a traction stud to detachably lock said stud to said mount.

60. The method set forth in claim 59 wherein said step of forming said head comprises the step of forming a rod mounting cylinder, transverse to said first mentioned cylinder, for mounting on a reinforcing rod adapted to be embedded in the track.

61. A method of mounting a plurality of traction studs, each having
an axially inner threaded end, and
an axially outer locking surface which diverges, relative to said inner threaded end, radially outwardly in an axially outer direction
to an endless drive track via a traction stud mount having an endless band provided with
an axially inner threaded cylinder and
an integral axially outer skirt which radially outwardly diverges in an axially outer direction;
said stud mount being adapted to be embedded in an endless resilient drive belt, said method including the steps of:

threading said axially inner end of said traction stud to said axially inner threaded cylinder of said stud mount to axially inwardly move said stud toward said stud mount; and frictionally engaging said axially outer skirt and said axially outer locking surface as said stud is axially moved toward said stud mount to detachably lock said stud to said stud mount without the use of a separate fastener.

62. The method set forth in claim 61 including the step of mounting said head on a reinforcing bar adapted to be embedded in a resilient drive belt.

63. A method of making a self-locking traction stud for an endless drive member, such as a snowmobile drive belt comprising the steps of selecting an elongate rod having an elongate axis, a predetermined breadth and length, and axially inner and outer ends;

radially inwardly reducing the breadth of an axially inner portion of said rod between said ends to provide a tapered, self-locking portion which tapers radially inwardly in an axially inner direction and a cylindrical terminal end portion which is axially inward of said tapered, self-locking portion; and externally threading said cylindrical terminal end portion to provide a thread for threadedly mating with a complementally formed thread on a stud mount.

64. The method set forth in claim 63 wherein said method further includes radially inwardly reducing an axially outer end portion of said rod between said ends and axially outwardly of said tapered, self-locking portion in an axially outer direction to provide an oppositely tapered ground engaging portion which tapers radially inwardly in an axially outer direction to provide a reduced diameter ground engaging end portion.

65. The method set forth in claim 63 wherein said step of radially inwardly reducing the breadth of said axially inner end portion includes the step of providing an annular sidewall portion which gradually progressively radially inwardly converges in an axially inner direction toward said thread to provide a smooth continuous self-locking surface.

66. The method set forth in claim 63 wherein said reducing step includes the step of providing a truncated cone shaped intermediate portion of said rod between said ends to provide said tapered self-locking portion.

67. The method set forth in claim 63 wherein said radially reducing step is accomplished by providing said tapered self-locking portion with an axial length which exceeds the axial length of said thread.

68. The method set forth in claim 63 wherein said reducing step is accomplished by cutting an annular, axially outwardly flaring annular sidewall into said rod to form said self-locking portion with an axially inner end of a predetermined diameter at least as large as the diameter of said thread and an axially outer end with a substantially larger diameter and cutting said a right circular cylinder to form said cylindrical terminal end.

69. The method set forth in claim 63 wherein said reducing step is accomplished by cutting an intermediate portion of said rod to form a truncated cone-shaped sidewall having an outer surface which gradually decreases in diameter in an axially inner direction.

70. A method of making a self-locking traction stud for an endless drive member, such as a snowmobile drive track comprising the steps of:

selecting an elongated rod having an elongate axis and axially inner and outer ends;

oppositely radially inwardly tapering axially spaced, inner and outer portions of said rod to provide an axially outer ground engaging end portion which tapers radially inwardly in an axially outer direction and an axially inner self-locking tapered outer surface which tapers radially inwardly in an axially inward direction; and threading an axially inner terminal end portion of said rod, axially inward of said self-locking tapered surface, with an elongate mounting thread having a breadth less than the breadth of said self-locking tapered surface.

71. The method set forth in claim 70 including the step of cutting an elongate, axially inwardly extending opening in the axially outer terminal end of said rod and inserting a hardened carbide tip into said opening.

72. The method set forth in claim 70 wherein said tapering step is accomplished by providing said sidewall with a predetermined axial length; said threading step being accomplished by providing said thread of a lesser predetermined length less than said predetermined length.

73. The method set forth in claim 70 including the step of providing wrench flats in an outer surface of said rod between said axially spaced inner and outer portions.

74. The method set forth in claim 73 including said step of providing wrench flats is accomplished by providing wrench flats in an increased diameter portion of said rod having a breadth greater than either of said axially spaced inner and outer portions.

75. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said self-locking means comprising a radially outer surface section which tapers radially outwardly in an axially outer direction to provide a radially outwardly, axially outwardly tapering surface for bearing against a complementally formed surface on said stud mount.

76. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said self-locking means comprising a sidewall section which radially outwardly diverges in an axially outward direction for bearing against a complementally formed section on said stud mount.

77. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said axially inner cylindrical threaded end section including an external thread having a predetermined diameter; said self-locking means comprising an intermediate frusto-conically shaped stud section having a diameter which gradually increases in an axially outward direction.

78. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said self locking means including inclined surface means which diverges diametrically outwardly of said axially inner cylindrical threaded stud mounting end section in an axially outward direction for frictionally engaging a complementally formed surface on said stud mount.

79. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said axially inner cylindrical threaded end section having a predetermined diameter, said self-locking means comprises a radially outer non-threaded surface having a diameter larger than said predetermined diameter.

80. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said axially outer end; and self-locking means between said axially inner threaded end section and said axially outer ground engaging end section for detachably frictionally locking said stud to said stud mount on said belt as said stud is moved axially inwardly to inhibit reverse rotation of said stud in said opposite direction;

said axially inner cylindrical threaded end section having a predetermined breadth and said self-locking means comprising a radially outer non-threaded surface of greater predetermined breadth greater than said predetermined breadth.

81. A one-piece, elongate traction stud, having an elongate rotational axis and axially inner and outer ends, for mounting on an endless snowmobile drive belt, said stud comprising:

an axially inner, cylindrical, threaded stud mounting end section at said axially inner end for threadedly engaging a complementally threaded stud mount on said belt to axially inwardly move said stud toward said stud mount when said stud is rotated in one direction of rotation relative to said stud mount and for axially outwardly moving said stud away from said stud mount when said stud is rotated in an opposite direction of rotation;

an axially outer ground engaging end section at said
axially outer end; and
self-locking means between said axially inner threaded
end section and said axially outer ground engaging end
section for detachably frictionally locking said stud to
said stud mount on said belt as said stud is moved
axially inwardly to inhibit reverse rotation of said stud
in said opposite direction;
said self-locking means comprising an axially extending
outer sidewall surface with a breadth which is greater
than the diameter of said cylindrical threaded section
and which radially outward increases in an axially outer
direction.

82. A one-piece, elongate traction stud, having an elongate rotational axis and axially inner and outer ends, for mounting on an endless snowmobile drive belt, said stud comprising:
an axially inner, cylindrical, threaded stud mounting end
section at said axially inner end for threadedly engaging a complementally threaded stud mount on said belt
to axially inwardly move said stud toward said stud
mount when said stud is rotated in one direction of
rotation relative to said stud mount and for axially
outwardly moving said stud away from said stud mount
when said stud is rotated in an opposite direction of
rotation;
an axially outer ground engaging end section at said
axially outer end; and
self-locking means between said axially inner threaded
end section and said axially outer ground engaging end
section for detachably frictionally locking said stud to
said stud mount on said belt as said stud is moved
axially inwardly to inhibit reverse rotation of said stud
in said opposite direction;
said threaded stud mounting end section having a predetermined outer diameter and said self-locking means
having a breadth greater than said predetermined diameter.

83. A one-piece, elongate traction stud, having an elongate rotational axis and axially inner and outer ends, for mounting on an endless snowmobile drive belt, said stud comprising:
an axially inner, cylindrical, threaded stud mounting end
section at said axially inner end for threadedly engaging a complementally threaded stud mount on said belt
to axially inwardly move said stud toward said stud
mount when said stud is rotated in one direction of
rotation relative to said stud mount and for axially
outwardly moving said stud away from said stud mount
when said stud is rotated in an opposite direction of
rotation;
an axially outer ground engaging end section at said
axially outer end; and
self-locking means between said axially inner threaded
end section and said axially outer ground engaging end
section for detachably frictionally locking said stud to
said stud mount on said belt as said stud is moved
axially inwardly to inhibit reverse rotation of said stud
in said opposite direction;
said self-locking means including axially inner and outer
sections, the breadth of said axially outer section being
greater than the breadth of said axially inner section.

84. A traction stud for improving the traction of an endless resilient drive member, such as a snowmobile drive belt, said stud comprising:
an elongate, one-piece shank having
an elongate axis,
an axially inner threaded end mounting section for
threadedly mounting said shank on an endless drive
member for rotation about said axis on said endless
drive member to axially inwardly move said shank
when rotated in one direction of rotation about said
axis and to axially outwardly move said shank when
rotated in an opposite direction;
an axially outer ground engaging end section, and
self-locking surface means, which flares radially outwardly in an axially outer direction, axially outward
of said axially inner threaded end mounting section
for bearing against a complementally formed surface
on said drive member as said stud is rotated in said
one direction and axially inwardly moves;
said self-locking surface means comprising an annular
sidewall shank section, disposed between said axially
inner threaded end section and said axially outer
ground engaging section, which radially outwardly
diverges in an axially outer direction.

85. A one-piece stud mount, having an elongate axis, for detectably mounting a traction stud on an outer surface of an endless snowmobile drive belt, said one-piece stud mount comprising:
an axially inner, hollow, cylindrical stud mounting
sidewall, adapted to be embedded in said drive belt,
defining a cylindrical passage of predetermined breadth
for detachably receiving a complementally formed
inner end of a traction stud; and
self-locking means for detachably locking said stud to
said stud mount comprising an axially outer, hollow
sidewall, integral with said axially inner stud mounting
sidewall, having an internal breadth which is greater
than said predetermined breadth;
said axially outer, hollow sidewall gradually flaring radially outwardly in an axially outer direction for bearing
against a complementally formed sidewall portion of a
traction stud.

86. The one-piece stud mount set forth in claim 85 wherein said hollow sidewall has substantially uniform radial thickness.

87. The one-piece stud mount set forth in claim 85 wherein hollow sidewall includes radially inner and outer surfaces which are spaced apart substantially the same distance throughout the length of said hollow sidewall.

88. An endless drive track for propelling a snowmobile comprising:
a resilient endless drive belt having
an inner surface,
an outer ground engaging surface, and
a plurality of apertures in said outer surface;
a plurality of stud mounting means, at least partially
embedded in said apertures, for mounting a plurality of
elongate traction studs;
a reinforcing rod embedded in said belt
a plurality of traction studs each having
an elongate axis,
an inner end for mounting on one of said stud mounting
means, and
an opposite, outer ground engaging end;
said stud mounting means and said traction studs including complementally formed self-locking surface means
for detachably locking said studs to said stud mounting
means; and
means integral with said stud mounting means for coupling said stud mounting means to said reinforcing rod.

89. A method of mounting an elongate traction stud, having a cylindrical, axially inner threaded end section, an axially outer end and an intermediate portion between said threaded end section and said axially outer end of greater breadth than the breadth of said threaded end section, to a reinforcing rod embedded in an endless drive belt comprising the steps of:
  coupling a one-piece stud mount having an elongate passage including
    an axially inner internally threaded cylindrical sidewall, and
    an axially outer sidewall, having a breadth greater than the diameter of said cylindrical sidewall,
  to the reinforcing rod embedded in the endless drive belt; and
  threading said cylindrical threaded end section of said stud in one direction of rotation in said internally threaded sidewall of said stud mount to axially move said intermediate end of said stud into frictional locking engagement with said axially outer sidewall and inhibit reverse rotation of said stud in an opposite direction opposite said one direction.

90. A method of mounting an elongate traction stud to an endless drive track, said stud having
  a cylindrical inner threaded end section,
  an axially outer ground engaging end, and
  an intermediate portion between said threaded end and said axially outer end of greater breadth than said threaded end to an endless drive belt, said method comprising the steps of:
    threadedly rotating said cylindrical inner threaded end section in one direction of rotation into a complementally threaded cylindrical surface on said track to axially translate said stud toward said track; and
    compressing said intermediate portion of said stud against a complementally formed surface on said track radially outward of said threaded cylindrical surface to axially force said stud against said complementally formed surface to detachably lock said stud to said track and inhibit reverse rotation of said stud;
  said intermediate portion including an intermediate self-locking section which has a breadth that gradually increases in an axially outer direction, and said complementally formed surface on said track comprising a radially outwardly tapering surface, said compressing step being accomplished by axially inwardly moving said intermediate self-locking section which has a breadth that gradually increases in an axially outer direction against a complementally formed radially outwardly tapering surface.

91. A one-piece stud mount, having an elongate axis, for detectably mounting a traction stud on an outer surface of an endless snowmobile drive belt, said one-piece stud mount comprising:
  an axially inner, hollow, cylindrical stud mounting sidewall, adapted to be embedded in said drive belt, defining a cylindrical passage of predetermined breadth for detachably receiving a complementally formed inner end of a traction stud;
  self-locking means for detachably locking said stud to said stud mount comprising an axially outer, hollow sidewall, integral with said axially inner stud mounting sidewall, having an internal breadth which is greater than said predetermined breadth; and
  transverse mounting head means, integral with said axially inner cylindrical stud mounting sidewall, for mounting said stud mount to a reinforcing rod adapted to be embedded in said endless snowmobile drive belt.

92. The one-piece stud mount set forth in claim 91 wherein said transverse mounting head means comprises a transverse wall having a substantially uniform thickness extending transversely to said axially inner stud mounting sidewall.

93. The one-piece stud mount set forth in claim 91 wherein said transverse mounting head means comprises a transverse cylinder integral with said stud mounting sidewall.

94. The one-piece stud set forth in claim 91, wherein said stud mounting sidewall includes axially inner and outer ends, said axially outer hollow sidewall being integral with said outer and of said stud mounting sidewall, said transverse mounting head means including a transverse wall of substantially uniform thickness integral with said axially inner end of said stud mounting sidewall.

95. The one-piece stud mount set forth in claim 4 including transverse mounting head means integral with axially inner cylindrical mounting section for mounting said stud mount to a reinforcing rod adapted to be embedded in the endless snowmobile drive belt.

96. The one-piece stud mount set forth in claim 95 wherein said transverse mounting head means comprises a transverse wall transverse to said elongate axis.

97. The one-piece stud mount set forth in claim 96 wherein said transverse wall comprises a cylindrical wall.

98. The one-piece stud mount set forth in claim 95 wherein said axially outer skirt comprises an annular sidewall of substantially uniform radial thickness.

99. The one-piece stud mount set forth in claim 98 wherein said transverse mounting head means including a transverse wall of substantially uniform thickness throughout its length.

100. The one-piece stud mount set forth in claim 9 including a mounting head means integral with axially inner cylindrical sidewall for mounting said stud mount to a reinforcing rod adapted to be embedded in the endless snowmobile drive belt.

101. The one-piece stud mount set forth in claim 100 wherein said transverse head comprises a transverse wall transverse to said elongate axis.

102. The one-piece stud mount set forth in claim 101 wherein said transverse wall comprises a cylindrical wall.

103. The one-piece stud mount set forth in claim 100 wherein said axially outer skirt comprises an annular sidewall of substantially uniform radial thickness.

104. The one-piece stud mount set forth in claim 103 wherein said transverse wall is of substantially uniform thickness throughout its length.

105. The one-piece stud mount set forth in claim 13 including a transverse head integral with said threaded sidewall.

106. The one-piece stud mount set forth in claim 105 wherein said transverse head comprises a transverse cylinder having a sidewall of substantially uniform thickness.

107. The one-piece traction stud set forth in claim 76 wherein said axially inner, cylindrical threaded stud mounting end section includes an external thread having a predetermined axial length; said sidewall section having a predetermined greater axial length greater than said predetermined axial length.

108. The traction stud set forth in claim 79 wherein said self-locking means includes a non-threaded right circular cylinder having a diameter substantially greater than said predetermined diameter.

109. The traction stud set forth in claim 79 wherein said self-locking means comprises a plurality of right circular cylinders stacked end-to-end and having diameter which progressively increases in an axially outer direction.

110. The traction stud set forth in claim 81 wherein said self-locking means comprises a smooth continuous outer surface which has a gradually increasing diameter in an axially outer direction.

111. The traction stud set forth in claim 84 wherein said axially inner threaded end section has a predetermined axial length, said annular sidewall section having a greater predetermined axial length which is greater than said predetermined axial length.

112. The one-piece stud mount set forth in claim 85 wherein said axially inner hollow cylindrical sidewall includes an internal thread having a predetermined axial length; said axially outer sidewall having a predetermined greater axial length which is greater than said predetermined length.

113. The one-piece stud mount set forth in claim 85 wherein said axially inner hollow cylindrical sidewall is internally threaded for threadedly receiving a complementally threaded inner end of said traction stud to axially inwardly move said traction stud when said stud is rotated in one direction about said axis; said axially outer sidewall bearing against an axially outer surface portion of said traction stud as said stud is axially inwardly moved to frictionally engage said axially outer surface portion of said stud to detachably inhibit reverse rotation of said stud.

114. The one-piece stud mount set forth in claim 85 including a transverse head extending transversely to said axis and integrally coupled to said sidewall.

115. The one-piece stud mount set forth in claim 114 wherein said head comprises a transverse cylinder integral with said sidewall.

116. The one-piece stud mount set forth in claim 114 wherein said head includes a transverse opening therein for receiving a reinforcing rod adapted to be embedded in said drive belt.

117. The one-piece stud set forth in claim 116 wherein said transverse opening is in communication with said cylindrical passage.

118. The stud mount set forth in claim 85 wherein each of said stud mounting means comprises an inner hollow cylindrical mounting end and a first, hollow, outwardly flaring sidewall axially outwardly of said inner cylindrical mounting end; said stud including an inner cylindrical end for detachably mounting in said hollow cylindrical mounting end and a second outwardly flaring sidewall, axially outwardly of said inner cylinder end, for bearing against said first outwardly flaring sidewall when said inner cylindrical end is received by said inner hollow cylindrical mounting end.

119. The stud mount set forth in claim 85 including mounting head means integral with said axially inner cylindrical stud mounting sidewall for mounting said stud mount to a reinforcing rod adapted to be embedded in said endless snowmobile drive belt.

120. The stud mount set forth in claim 119 wherein said mounting head means comprises a cylindrically shaped sidewall having an axis substantially normal to said elongate axis.

\* \* \* \* \*